United States Patent
Zenkyu

(10) Patent No.: US 11,936,447 B2
(45) Date of Patent: Mar. 19, 2024

(54) OAM MODE MULTIPLEXING TRANSMISSION APPARATUS, OAM MODE MULTIPLEXING RADIO TRANSMISSION SYSTEM, METHOD FOR CORRECTING OAM MODE MULTIPLEXING TRANSMISSION APPARATUS, AND COMPUTER-READABLE NON-TRANSIENT RECORDING MEDIUM

(71) Applicant: NEC Corporation, Tokyo (JP)

(72) Inventor: Ryuji Zenkyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/894,266

(22) Filed: Aug. 24, 2022

(65) Prior Publication Data

US 2023/0070654 A1    Mar. 9, 2023

(30) Foreign Application Priority Data

Sep. 6, 2021 (JP) .................................. 2021-144583

(51) Int. Cl.
*H04B 7/0456* (2017.01)
(52) U.S. Cl.
CPC ................................. *H04B 7/0456* (2013.01)
(58) Field of Classification Search
CPC .. H04J 14/04; H04J 11/00; H04J 99/00; H04J 11/0023; H04J 1/00; H04J 14/00; H04J 14/0227; H04J 2203/0005; H04B 7/0456; H04B 7/0413; H04B 7/0469; H04B 7/0697; H04B 7/0617; H04B 10/516; H04B 10/1125; H04B 7/0848

USPC ......................................................... 375/267
See application file for complete search history.

(56) References Cited

U.S. PATENT DOCUMENTS

| | | | |
|---|---|---|---|
| 11,088,752 B1 * | 8/2021 | Klemes | ................ H04B 7/0805 |
| 2021/0058118 A1 | 2/2021 | Sasaki et al. | |
| 2021/0111781 A1 * | 4/2021 | Sasaki | .................. H04B 7/0469 |
| 2021/0288699 A1 | 9/2021 | Hirabe | |
| 2022/0029690 A1 * | 1/2022 | Alavi | ....................... H01Q 3/34 |
| 2022/0408274 A1 * | 12/2022 | Horn | ..................... H04W 72/21 |

FOREIGN PATENT DOCUMENTS

| | | |
|---|---|---|
| JP | 2017-112570 A | 6/2017 |
| WO | 2020/022174 A1 | 1/2020 |
| WO | 2019/189704 A1 | 2/2021 |

* cited by examiner

*Primary Examiner* — Eva Y Puente

(57) ABSTRACT

The OAM mode multiplexing transmission apparatus includes a UCA antenna, a correction circuit, a correction value calculation circuit that calculates correction values, and a correction value feedback part that regularly feeds back the correction values from a receiving end to a transmitting end. The correction value calculation circuit is connected to a database that stores information about an ideal MIMO channel matrix, which is calculated by using an array diameter of the UCA antenna, a number of antenna elements, an RF frequency, and a link distance as parameters, in a state in which transmission and reception UCA antennas face each other, or is connected to a calculation apparatus that calculates the information. The correction value calculation circuit regularly calculates the correction values relating to signal phase rotation by using a MIMO channel matrix estimated with known signals embedded in received transmission frames and the ideal MIMO channel matrix.

18 Claims, 15 Drawing Sheets

ANTENNA100

ANTENNA200

OAM MODE MULTIPLEXING TRANSMISSION APPARATUS, OAM MODE MULTIPLEXING RADIO TRANSMISSION SYSTEM, METHOD FOR CORRECTING OAM MODE MULTIPLEXING TRANSMISSION APPARATUS, AND COMPUTER-READABLE NON-TRANSIENT RECORDING MEDIUM

CROSS REFERENCE TO RELATED APPLICATIONS

This application is based upon and claims the benefit of the priority of Japanese patent application No. 2021-144583, filed on Sep. 6, 2021, the disclosure of which is incorporated herein in its entirety by reference thereto.

FIELD

The present invention relates to an OAM mode multiplexing transmission apparatus, an OAM mode multiplexing radio transmission system, a method for correcting an OAM mode multiplexing transmission apparatus, and a program.

BACKGROUND

There is a demand for increasing the capacity of mobile backhaul and fronthaul, and attention has been focused on spatial multiplexing transmission schemes using MIMO (Multiple Input and Multiple Output). Mobile backhaul and fronthaul assumes a line-of-sight environment in which there is no obstacle between transmission and reception antennas. As one of the MIMO transmission schemes in a line-of-sight environment, there is an OAM (Orbital Angular Momentum) mode multiplexing transmission scheme. In the OAM mode multiplexing transmission scheme in which UCA (Uniform Circular Array) antennas each including N antenna elements (N is an integer of 2 or more) are used, on an ideal MIMO channel, high-quality communication can be realized by calculating a DFT (Discrete Fourier Transform) matrix and an IDFT (Inverse DFT) matrix for OAM mode signal multiplexing processing in a transmitting end and OAM mode signal demultiplexing processing in a receiving end with calculations. In typical MIMO transmission, matrices used for multiplexing and demultiplexing are obtained by performing singular value decomposition on an estimated MIMO channel matrix. Since the matrices used for multiplexing and demultiplexing are regularly updated, the circuit implementation cost is high. In contrast, as described above, in the OAM mode multiplexing transmission scheme, since the DFT and IDFT matrices are always used, the circuit implementation cost is lower than that of the typical MIMO transmission. In addition, when N is equal to $2^k$ (k is an integer of 1 or more), since multiplexing and demultiplexing can be performed by FFT (Fast Fourier Transform) and IFFT (Inverse FFT), the circuit implementation cost is further reduced. With the advantages described above, the OAM mode multiplexing transmission scheme has attracted attention as the next-generation mobile backhaul and fronthaul communication scheme.

FIG. 1 is a diagram illustrating a state in which UCA antennas face each other. The above ideal MIMO channel refers to a MIMO channel in which transmission and reception UCA antennas 100 and 200 face each other as illustrated in FIG. 1 and an individual difference in characteristics among RF (radio frequency) circuits associated with respective antenna elements 101-1 to 101-4 and 201-1 to 201-4 is sufficiently small.

FIG. 2 is a diagram illustrating a state in which one of the UCA antennas is tilted. In contrast to the ideal MIMO channel, in an actual MIMO channel, as illustrated in FIG. 2, an antenna is tilted due to an antenna installation error or disturbance such as wind or vibration. In addition, due to the influence of an individual difference in characteristics among the RF circuits, the actual MIMO channel is deviated from the ideal MIMO channel. Thus, in the OAM mode multiplexing transmission scheme using calculation with the above DFT and IDFT matrices, the accuracy of multiplexing and demultiplexing is degraded, and the reception quality is consequently degraded. Therefore, a function of correcting the deviation between the actual MIMO channel and the ideal MIMO channel is needed.

Patent Literature (PTL) 1 proposes a method for correcting the deviation between an actual MIMO channel and an ideal MIMO channel. Specifically, on the receiving end, singular value decomposition is performed on an actual MIMO channel matrix estimated with known signals, correction values are calculated from the difference between the obtained matrices used for multiplexing and demultiplexing and the DFT and IDFT matrices, and the correction values are fed back to transmission and reception correction circuits.

PTL 2 discusses an antenna displacement correction method for an OAM multiplexing communication system to detect and correct a physical displacement amount (a tilt) of a UCA antenna.

PTL 3 discusses an array antenna apparatus which acquires a channel estimation value between an antenna element that has transmitted a reference signal and each of the other antenna elements that have received the reference signal, obtains bidirectional channel estimation values, and calculates a calibration coefficient for each of the antenna elements from respective bidirectional channel estimation values.

PTL 1: WO 2020/022174
PTL 2: Japanese Patent Republication WO 2019/189704
PTL 3: Japanese Patent Kokai Publication No. 2017-112570

SUMMARY

The following analysis has been made by the present invention.

However, if the method discussed in PTL 1 is implemented as it is, since the calculation cost of the singular value decomposition is high, the circuit implementation cost and the time needed to obtain the correction values will be problems. If the time needed to obtain the correction values can be shortened, even when an antenna temporally vibrates due to disturbance such as wind and vibration, the correction can be performed at a speed at which the antenna vibration can be sufficiently followed. In particular, since it takes time to feed back the correction values calculated at the receiving end to the transmitting end (feedback delay), by shortening the time needed to calculate the correction values, the feedback delay can be shortened as much as possible and high-quality communication can be maintained even when a severe antenna vibration occurs. Since an antenna temporally vibrates due to disturbance such as wind or vibration, regular correction is needed to maintain stable high-quality communication during operation. However, in the method described in PTL 1, there is no description about an LPF (Low Pass Filter), which is indispensable for repetitive correction because the purpose of this method is perhaps to calibrate a tilt of an antenna when the antenna is installed. In a system with a long feedback delay, if obtained correction values are set in the correction circuits without causing the correction values to pass through an LPF, the correction diverges, and therefore, high-quality communication cannot be maintained. Therefore, the correction values that have passed through the LPF need to be set.

Thus, the calculation cost of the singular value decomposition of a matrix as discussed in the above PTL 1 is high. In addition, the repetitive correction needs to be performed so as to address the temporal vibration of the antenna due to disturbance such as wind and vibration. However, since the apparatus configuration according to the invention discussed in the above PTL 1 does not include an LPF, the correction diverges, and therefore, high-quality communication cannot be maintained. In accordance with the method discussed in PTL 2, a physical tilt of a UCA antenna can be detected and corrected. However, in a case of a configuration in which an RF circuit is connected to each antenna element, as in the configuration of the apparatus according to the present invention, correction also including the influence of an individual difference in characteristics among the RF circuits needs to be performed.

An object of the present invention is to provide an OAM mode multiplexing transmission apparatus, an OAM mode multiplexing radio transmission system, a method for correcting an OAM mode multiplexing transmission apparatus, and a program that contribute to regularly or repeatedly performing correction at a low calculation cost.

According to a first aspect of the present invention, there is provided an OAM (Orbital Angular Momentum) mode multiplexing transmission apparatus, including:
a UCA (Uniform Circular Array) antenna that includes N antenna elements (N is an integer of 2 or more) arranged in a ring shape at equal intervals;
a correction circuit that corrects an antenna tilt and an individual difference in characteristics among RF (Radio Frequency) circuits by using correction values;
a correction value calculation circuit that calculates the correction values; and
a correction value feedback part that regularly feeds back the correction values from a receiving end to a transmitting end;
wherein the correction value calculation circuit is connected to a database that stores information about an ideal MIMO (Multiple Input and Multiple Output) channel matrix, which is calculated by using an array diameter of the UCA antenna, a number of antenna elements, an RF frequency, and a link distance as parameters, in a state in which transmission and reception UCA antennas face each other, or is connected to a calculation apparatus that calculates the information; and
wherein the correction value calculation circuit regularly calculates the correction values relating to signal phase rotation by using a MIMO channel matrix estimated with known signals embedded in received transmission frames and the ideal MIMO channel matrix.

According to a second aspect of the present invention, there is provided an OAM mode multiplexing radio transmission system, including a first OAM mode multiplexing transmission apparatus according to the first aspect of the present invention on a transmitting end that transmits the transmission frames and a second OAM mode multiplexing transmission apparatus according to the first aspect of the present invention on a receiving end that receives the transmission frames.

According to a third aspect of the present invention, there is provided a method for correcting an OAM (Orbital Angular Momentum) mode multiplexing transmission apparatus, which includes a UCA (Uniform Circular Array) antenna that includes N antenna elements (N is an integer of 2 or more) arranged in a ring shape at equal intervals, a correction circuit, a correction value calculation circuit that calculates correction values, and a correction value feedback part and in which the correction value calculation circuit is connected to a database that stores information about an ideal MIMO (Multiple Input and Multiple Output) channel matrix, which is calculated by using an array diameter of the UCA antenna, a number of antenna elements, an RF frequency, and a link distance as parameters, in a state in which transmission and reception UCA antennas face each other, or is connected to a calculation apparatus that calculates the information, the method including:
by the correction value calculation circuit, regularly calculating the correction values relating to signal phase rotation by using a MIMO channel matrix estimated with known signals embedded in received transmission frames and the ideal MIMO channel matrix;
by the correction circuit, correcting an antenna tilt and an individual difference in characteristics among RF circuits by using the correction values; and
by the correction value feedback part, regularly feeding back the correction values from a receiving end to a transmitting end.

According to a fourth aspect of the present invention, there is provided a program, causing a computer provided in an OAM (Orbital Angular Momentum) mode multiplexing transmission apparatus, which includes a UCA (Uniform Circular Array) antenna that includes N antenna elements (N is an integer of 2 or more) arranged in a ring shape at equal intervals and which is connected to a database that stores information about an ideal MIMO (Multiple Input and Multiple Output) channel matrix, which is calculated by using an array diameter of the UCA antenna, a number of antenna elements, an RF frequency, and a link distance as parameters, in a state in which transmission and reception UCA antennas face each other, or which is connected to a calculation apparatus that calculates the information, to perform processing for:
regularly calculating correction values relating to signal phase rotation by using a MIMO channel matrix estimated with known signals embedded in received transmission frames and the ideal MIMO channel matrix;
correcting an antenna tilt and an individual difference in characteristics among RF circuits by using the correction values; and
regularly feeding back the correction values from a receiving end to a transmitting end. This program can be recorded in a computer-readable storage medium. The storage medium may be a non-transient storage medium such as a semiconductor memory, a hard disk, a magnetic recording medium, or an optical recording medium. The present invention can be embodied as a computer program product.

The present invention can provide an OAM mode multiplexing transmission apparatus, an OAM mode multiplexing radio transmission system, a method for correcting an OAM mode multiplexing transmission apparatus, and a program that contribute to regularly or repeatedly performing correction at a low calculation cost.

PREFERRED MODES

Figure 1:
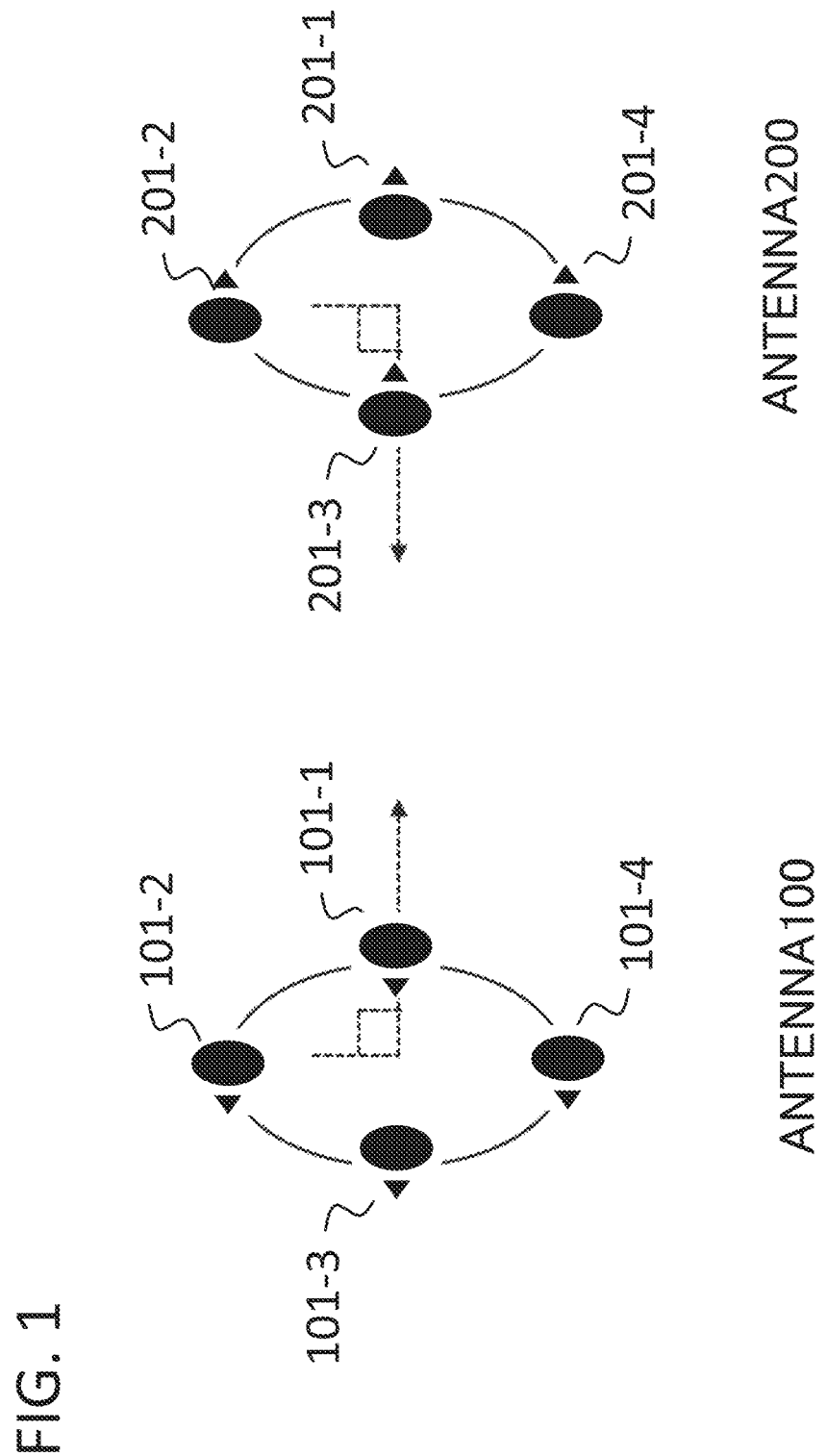
FIG. 1 is a diagram illustrating a state in which UCA antennas face each other.
Figure 2:
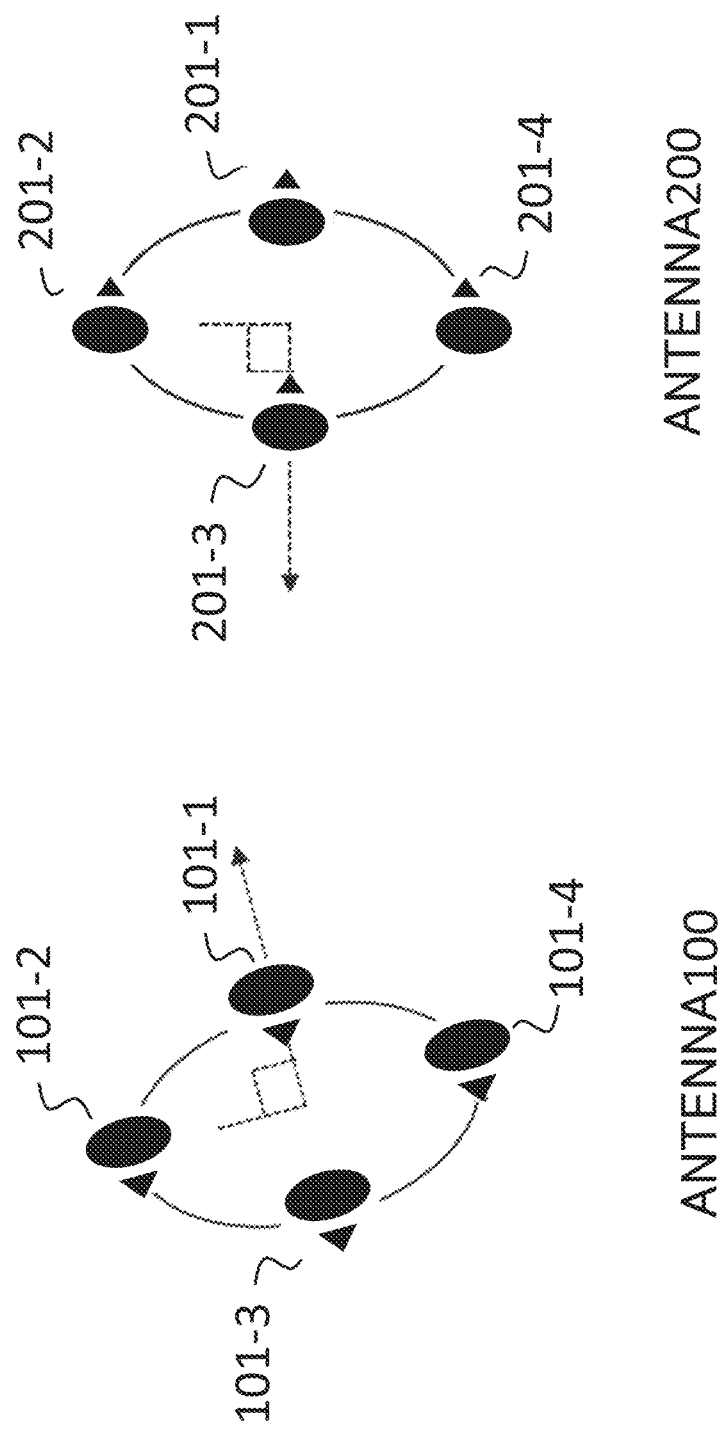
FIG. 2 is a diagram illustrating a state in which a UCA antenna is tilted.

First, an outline of an example embodiment of the present invention will be described with reference to drawings. In the following outline, various components are denoted by reference characters for the sake of convenience. That is, the following reference characters are merely used as examples to facilitate understanding of the present invention. Thus, the description of the outline is not intended to limit the present invention to the illustrated modes. An individual connection line between blocks in the drawings, etc. referred to in the following description signifies both one-way and two-way directions. A one way arrow schematically illustrates a principal signal (data) flow and does not exclude bidirectionality.

Figure 3:
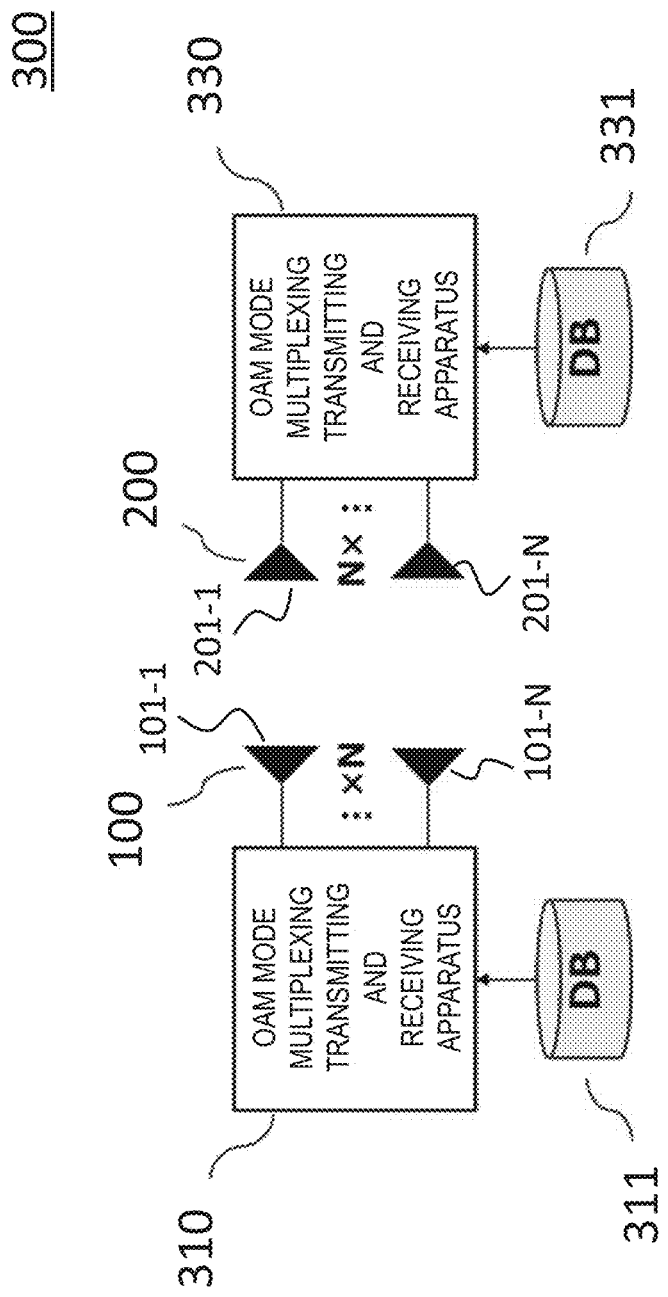
FIG. 3 is a diagram illustrating an example of a configuration of an OAM mode multiplexing radio transmission system according to the example embodiment of the present invention.

FIG. 3 is a diagram illustrating an example of a configuration of an OAM mode multiplexing radio transmission system 300 according to an example embodiment of the present invention. As illustrated in FIG. 3, the OAM mode multiplexing radio transmission system 300 according to the example embodiment of the present invention includes OAM mode multiplexing transmission apparatuses 301 and 302. The OAM mode multiplexing transmission apparatus 301 includes an OAM mode multiplexing transmitting and receiving apparatus 310, an antenna 100, and a database (DB) 311. The OAM mode multiplexing transmission apparatus 302 includes an OAM mode multiplexing transmitting and receiving apparatus 330, an antenna 200, and a database (DB) 331. The antenna 100 includes antenna elements 101-1 to 101-N, and the antenna 200 includes antenna elements 201-1 to 201-N. When these antenna elements do not particularly need to be distinguished from one another by their respective reference numerals 1 to N, any of the antenna elements will simply be referred to as an antenna element 101 or 201. In the present invention, each of the OAM mode multiplexing transmission apparatuses 301 and 302 will be described as a bidirectional communication apparatus using FDD (Frequency Division Duplex). However, alternatively, each of the OAM mode multiplexing transmission apparatuses 301 and 302 may be an apparatus using TDD (Time Division Duplex), as long as transmission correction values obtained by a receiving end can be regularly fed back to a transmitting end.

Figure 4:
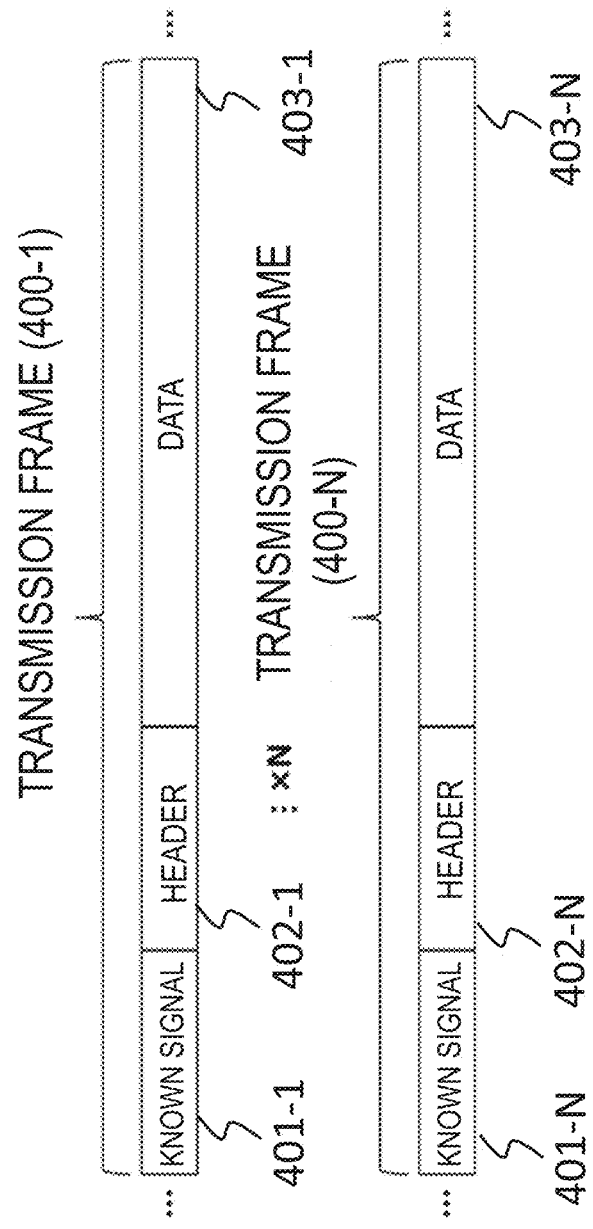
FIG. 4 is a diagram illustrating an example of a configuration of an individual transmission frame according to the example embodiment of the present invention.

FIG. 4 is a diagram illustrating an example of a configuration of an individual transmission frame according to the example embodiment of the present invention. Transmission frames 400-1 to 400N include known signals 401-1 to 401-N, headers 402-1 to 402-N, and data 403-1 to 403-N. When these transmission frames and their respective constituent elements do not particularly need to be distinguished from one another by their respective reference numerals 1 to N, the transmission frames and their respective constituent elements will simply be referred to as transmission frames 400, known signals 401, headers 402, and data 403. A set of modulation schemes selectable by the transmitting and receiving apparatuses is "QPSK (Quadrature Phase Shift Keying), 16QAM (Quadrature Amplitude Modulation), 64QAM, and 256QAM", and so on.

The known signal 401 is used for channel estimation purpose, which will be described below, and has a different pattern per modulator. For the known signal 401, an orthogonal matrix such as a Hadamard matrix is used as a pattern, for example, to facilitate channel estimation and is always transmitted by using, for example, the lowest modulation scheme (for example, QPSK) so that the reception can be achieved even when the reception quality (for example, CNR (Carrier to Noise power Ratio) or SINR (Signal to Interference and Noise power Ratio)) is at its worst. That is, the known signal 401 is mapped as, for example, a QPSK signal.

The header 402 includes control information from the transmitting end to the receiving end and feedback control information from the receiving end to the transmitting end. As with the known signal 401, the header 402 is always transmitted by using, for example, the lowest modulation scheme (for example, QPSK). The feedback control information from the receiving end to the transmitting end includes a correction value to be supplied to a transmission correction circuit.

The data 403 is user data. The data 403 is transmitted by using an appropriate modulation scheme (for example, 256QAM) according to the reception quality. It is assumed that a cycle of the transmission frames 400 is continuous or at regular intervals.

The OAM mode multiplexing transmission apparatus 301 in FIG. 3 includes the antenna 100, the OAM mode multiplexing transmitting and receiving apparatus 310, and the database 311. The antenna 100 is a UCA antenna including N antenna elements 101-1 to 101-N (N is an integer of 2 or more) arranged in a ring shape at equal intervals.

Figure 5:
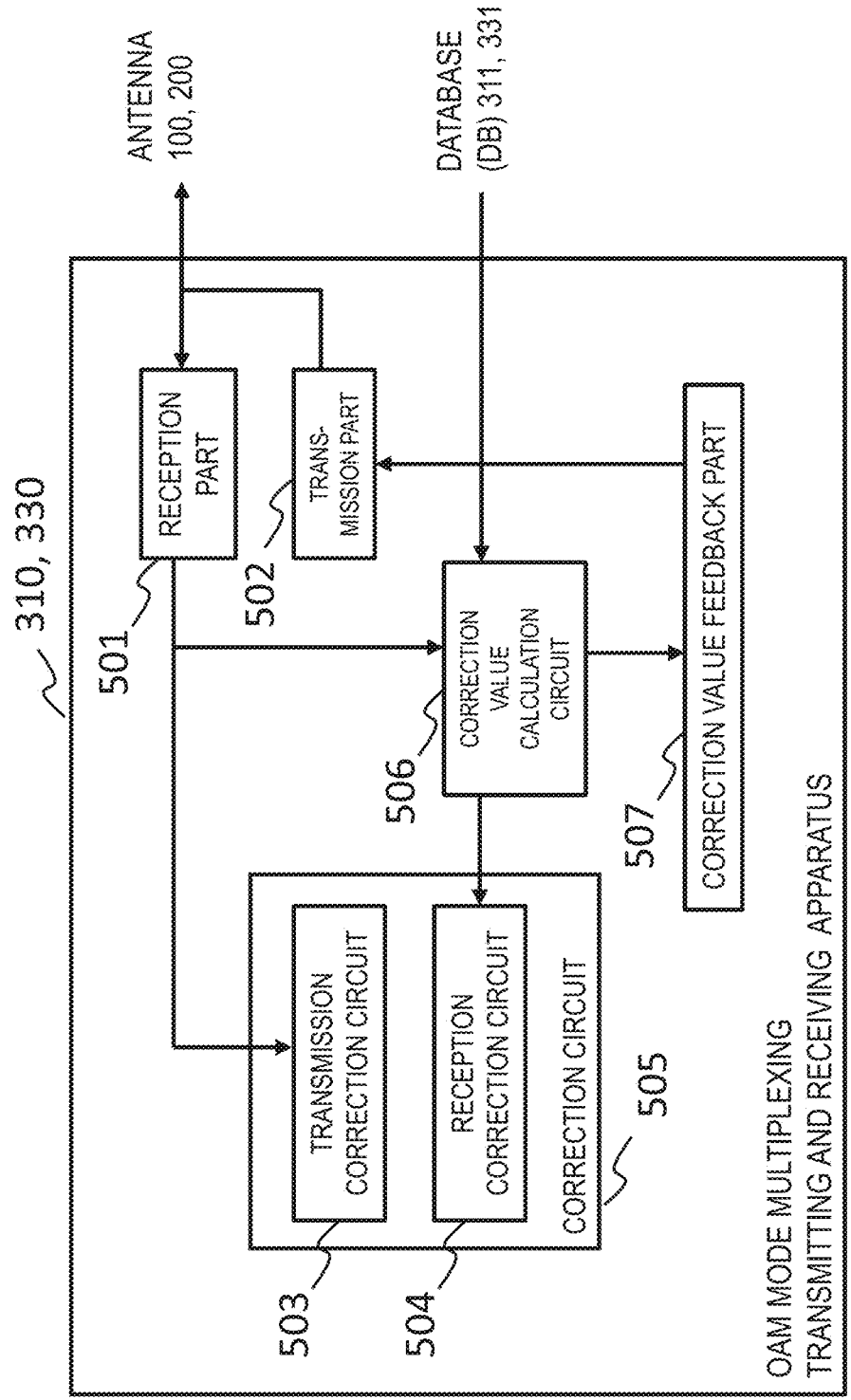
FIG. 5 is a diagram illustrating an example of a configuration of an OAM mode multiplexing transmitting and receiving apparatus in an OAM mode multiplexing transmission apparatus in the OAM mode multiplexing radio transmission system according to the example embodiment of the present invention.

FIG. 5 is a diagram illustrating an example of a schematic configuration of each of the OAM mode multiplexing transmitting and receiving apparatuses 310 and 330 of the OAM mode multiplexing transmission apparatuses 301 and 302 in the OAM mode multiplexing radio transmission system 300 illustrated in FIG. 3 according to the example embodiment of the present invention. The present example embodiment will be described assuming that the OAM mode multiplexing transmitting and receiving apparatuses 310 and 330 have the same configuration. However, the OAM mode multiplexing transmitting and receiving apparatuses 310 and 330 may have different configurations.

The OAM mode multiplexing transmitting and receiving apparatus 310 illustrated in FIG. 5 includes a reception part 501, a transmission part 502, a correction circuit 505 that corrects an antenna tilt and an individual difference in characteristics among the RF circuits, a correction value calculation circuit 506 that calculates correction values, and a correction value feedback part 507 that regularly feeds back the correction values from the receiving end to the transmitting end. The correction circuit 505 may include a transmission correction circuit 503 and a reception correction circuit 504. In addition, the correction value calculation circuit 506 is connected to the database 311 that stores information about an ideal MIMO channel matrix in a state in which the transmitting and receiving UCA antennas 100 and 200 face each other, which is calculated by using the array diameter of the UCA antenna 100, the number of elements of the UCA antenna 100, the RF frequency, and the link distance as parameters. The correction value calculation circuit 506 may be connected to a calculation apparatus (not illustrated) that calculates information about the ideal MIMO channel matrix, in place of the database 311.

Next, operations of the OAM mode multiplexing transmitting and receiving apparatuses 310 and 330 in FIG. 5 will be described.

The reception part 501 in the OAM mode multiplexing transmitting and receiving apparatus 310 receives the transmission frames 400 transmitted from the transmitting end via the antenna 100 illustrated in FIG. 3.

The correction value calculation circuit 506 regularly calculates correction values relating to signal phase rotation by using a MIMO channel matrix estimated by using the known signals 401 embedded in the received transmission frames 400 and a calculated ideal MIMO channel matrix stored in the database (DB) 311 in FIG. 3.

Among the regularly calculated correction values, reception correction values are set in the reception correction circuit 504 in the OAM mode multiplexing transmitting and receiving apparatus 310. In addition, among the regularly calculated correction values, transmission correction values are stored in the headers 402 in the transmission frames 400 as the correction values, and are transmitted to the opposite OAM mode multiplexing transmission apparatus 302 illustrated in FIG. 3, by the transmission frames 400, via the correction value feedback part 507, the transmission part 502, and the antenna 100.

Note that the OAM mode multiplexing transmitting and receiving apparatus 330 in the opposite OAM mode multiplexing transmission apparatus 302 in FIG. 3 extracts the correction values from the headers 402 in the transmission frames 400 received via the antenna 200 and the extracted correction values are set in the transmission correction circuit 503 in the OAM mode multiplexing transmitting and receiving apparatus 330 as the transmission correction values.

As described above, the example embodiment of the present invention can provide an OAM mode multiplexing transmission apparatus that contributes to regularly or repeatedly performing correction at a low calculation cost without using singular value decomposition of a matrix.

First Example Embodiment

Figure 6:
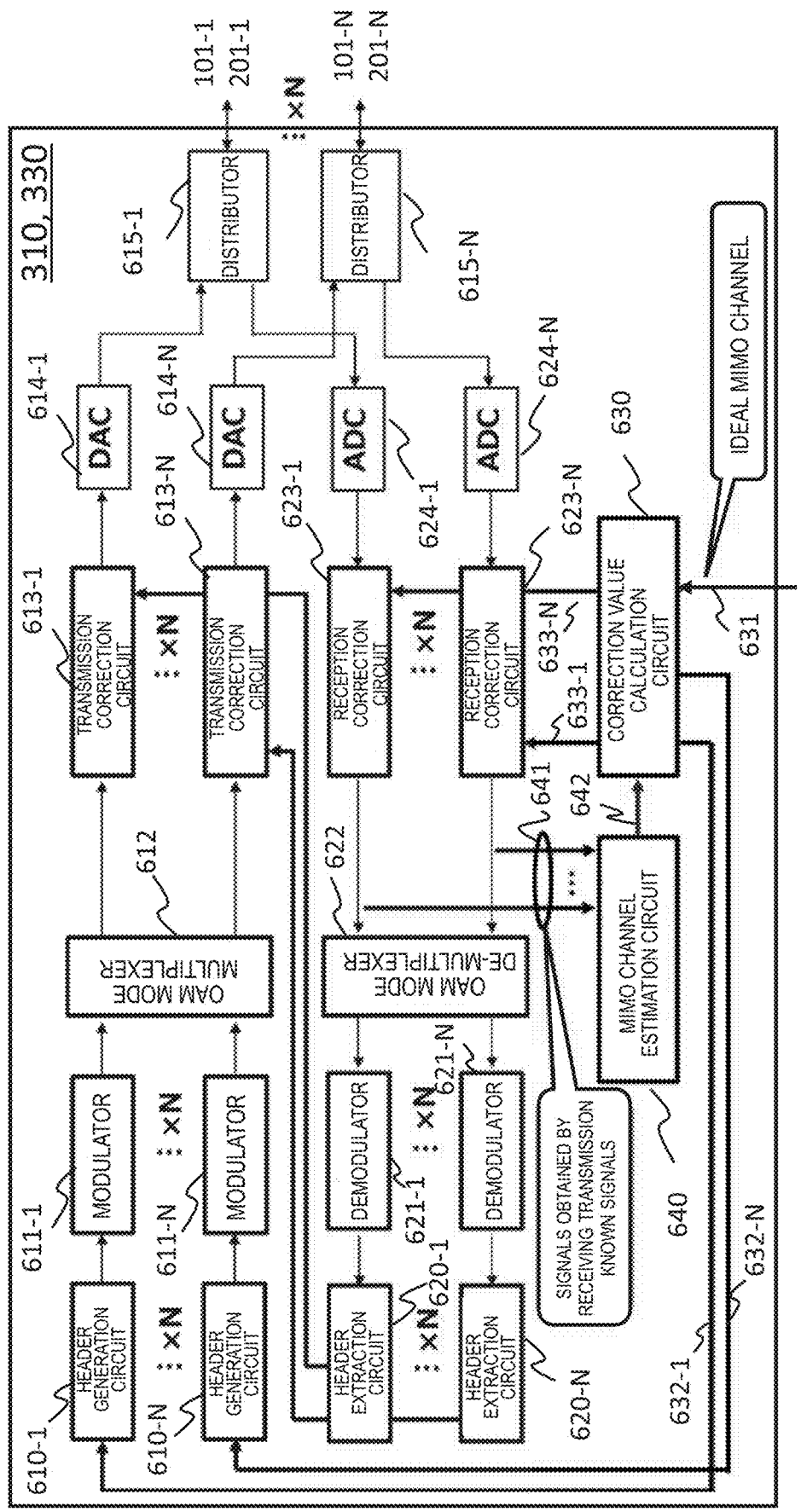
FIG. 6 is a block diagram illustrating an example of a configuration of an OAM mode multiplexing transmitting and receiving apparatus according to a first example embodiment of the present invention.

Next, OAM mode multiplexing transmitting and receiving apparatuses 310 and 330 according to a first example embodiment of the present invention will be described with reference to drawings. FIG. 6 is a block diagram illustrating an example of a configuration of an OAM mode multiplexing transmitting and receiving apparatus according to the first example embodiment of the present invention. In FIG. 6, components denoted by the same reference numerals as those in FIG. 3 indicate the same components as those in FIG. 3.

FIG. 6 illustrates an example of a configuration of the OAM mode multiplexing transmitting and receiving apparatus 310 or 330 in the corresponding one of the OAM mode multiplexing transmission apparatuses 301 and 302 in the OAM mode multiplexing radio transmission system 300 in FIG. 3. While the present first example embodiment will be described assuming that the OAM mode multiplexing transmitting and receiving apparatuses 310 and 330 have the same configuration, the OAM mode multiplexing transmitting and receiving apparatuses 310 and 330 may have different configurations. Hereinafter, a configuration of the OAM mode multiplexing transmitting and receiving apparatus 310 will be described. The same applies to the configuration of the OAM mode multiplexing transmitting and receiving apparatus 330.

With reference to FIG. 6, the OAM mode multiplexing transmitting and receiving apparatus 310 includes N header generation circuits 610-1 to 610-N, N modulators 611-1 to 611-N, an OAM mode multiplexer 612, N transmission correction circuits 613-1 to 613-N, N demodulators 621-1 to 621-N, an OAM mode demultiplexer 622, N reception correction circuits 623-1 to 623-N, N DACs (digital/analog converters) 614-1 to 614-N, N ADCs (analog/digital converters) 624-1 to 624-N, distributors 615-1 to 615-N, a MIMO channel estimation circuit 640, a correction value calculation circuit 630, and N header extraction circuits 620-1 to 620-N. The correction value calculation circuit 630 is connected to a database 311 that stores information about an ideal MIMO channel matrix or to a calculation apparatus (not illustrated) that calculates the information about the ideal MIMO channel matrix via a connection terminal 631. The distributors 615-1 to 615-N are connected to antenna elements 101-1 to 101-N of an antenna 100. Note that when the above components do not particularly need to be distinguished from one another by their respective reference numerals 1 to N, the above components will simply be referred to as the antenna element 101, header generation circuits 610, modulators 611, transmission correction circuits 613, DACs 614, distributors 615, header extraction circuits 620, demodulators 621, reception correction circuits 623, and ADCs 624.

Next, each circuit in the OAM mode multiplexing transmitting and receiving apparatus 310 in FIG. 6 will be described in detail below.

The header generation circuits 610 are circuits that embed, among the correction values calculated by the correction value calculation circuit 630, transmission correction values in the transmission frames 400 as information in the headers 402. The transmission frames 400 in which the transmission correction values are embedded are transmitted to the opposite OAM mode multiplexing transmitting and receiving apparatus 330 and supplied to the transmission correction circuits 613 via the header extraction circuits 620 in the opposite OAM mode multiplexing transmitting and receiving apparatus 330.

The modulators 611 receive and convert the transmission frames 400 (known signals 401, headers 402, and data 403) into modulated signals (symbols) and outputs the modulated signals. Note that a set of modulation schemes selectable by the transmitting and receiving apparatus is "QPSK, 16QAM, 64QAM, and 256QAM", and so on. The known signals 401 and the headers 402 are always transmitted by using the lowest modulation scheme (for example, QPSK) such that the reception can be achieved even when the reception quality (for example, CNR or SINR) is at its worst. The data 403 is transmitted by using an appropriate modulation scheme (for example, 256QAM) according to the reception quality.

The OAM mode multiplexer 612 is a circuit that receives N modulated signals and generates transmission OAM mode signals by performing linear filtering using an IDFT (Inverse Discrete Fourier Transform) matrix of which degree is N. Note that as will be described below, it is assumed that a transmission known signal is a signal obtained after the "known signal" of a modulated transmission frame has passed through the OAM mode multiplexer 612.

The transmission correction circuits 613-1 to 613-N are circuits that output signals obtained by applying phase rotation to the transmission OAM mode signals outputted from the OAM mode multiplexer 612 as corrected transmission OAM mode signals to be transmitted from the antenna elements 101-1 to 101-N.

The DACs are circuits that convert digital signals (the corrected transmission OAM mode signals) into analog signals and up-convert the analog signals into RF signals.

The distributors 615 are circuits for performing reception and transmission at the same frequency, and output transmission signals from the antenna elements 101 for transmitting signals and output reception signals received by the antenna elements 101 to the reception correction circuits 623.

The ADCs are circuits that down-convert RF signals into analog signals and convert the analog signals into digital signals.

The reception correction circuits 623 are circuits that apply, as correction, phase rotation to the reception OAM mode signals received by respective antenna elements 101-1 to 101-N and output the resultant signals as corrected reception OAM mode signals.

The OAM mode demultiplexer 622 is a circuit that receives N corrected reception OAM mode signals, demultiplexer the corrected reception OAM mode signals by performing linear filtering using DFT (Discrete Fourier Transform) of which degree is N, and outputs the resultant signals as OAM mode demultiplexed signals.

The demodulators are circuits that receive the OAM mode demultiplexed signals, convert the signals into digital data, and outputs the digital data.

The MIMO channel estimation circuit 640 is a circuit that receives signals 641 obtained by receiving the transmission known signals embedded in the transmission frames 400, which is outputted by the reception correction circuits 623 and estimates a MIMO channel matrix by correlating the signals obtained by receiving the transmission known signals with predetermined transmission known signals. In other words, the channel estimation circuit 640 estimates a MIMO channel matrix, which is a plurality of paths from the output of the OAM mode multiplexer 612 on the transmitting end to the input of the OAM mode demultiplexer 622 on the receiving end.

The correction value calculation circuit 630 receives an ideal MIMO channel matrix received from the database (DB) 311 via the connection terminal 631 and the MIMO channel matrix estimated by the MIMO channel estimation circuit 640 and calculates phase rotation amounts of the signals transmitted from the transmission and reception antenna elements 101 as correction values. The receiving-end correction values are supplied to the reception correction circuits 623. The transmitting-end correction values are supplied to the header generation circuits 610, and are transmitted to the opposite OAM mode multiplexing transmitting and receiving apparatus 330 via the modulators 611, then, are supplied to the transmission correction circuits 613 in the opposite OAM mode multiplexing transmitting and receiving apparatus 330 via the header extraction circuit 620 in the opposite OAM mode multiplexing transmitting and receiving apparatus 330.

The header extraction circuits 620 are circuits that extract, from the demodulated digital data, the correction values embedded as headers by the header generation circuits 610 in the opposite OAM mode multiplexing transmitting and receiving apparatus 330 and supply the correction values to the transmission correction circuits 613.

Figure 7:
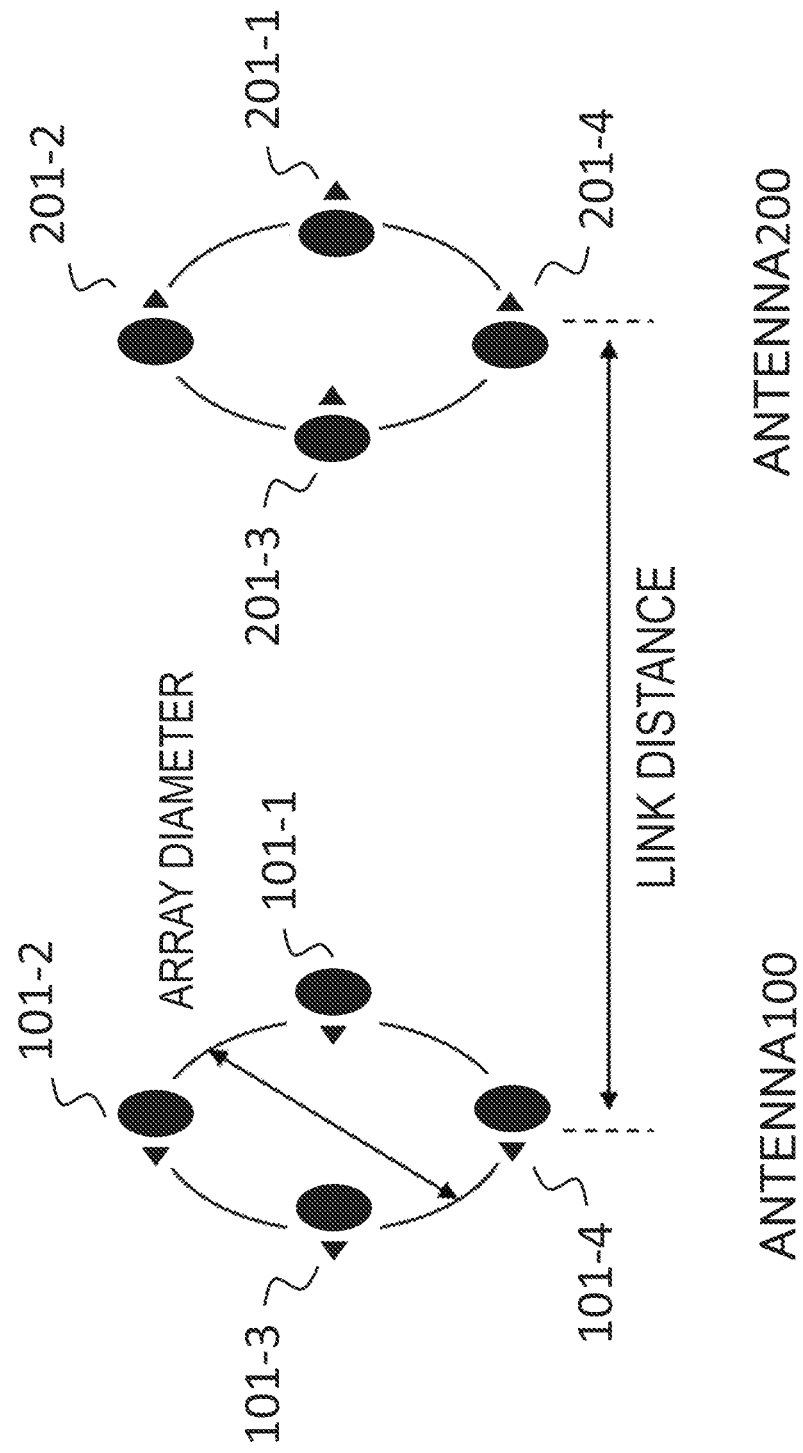
FIG. 7 is a diagram illustrating an example of an individual antenna according to the first example embodiment of the present invention.

FIG. 7 is a diagram illustrating an example of an individual UCA antenna. The individual UCA antenna is an antenna in which N antenna elements are arranged concentrically at equal intervals. While FIG. 7 illustrates the individual antenna in which four antenna elements 101-1 to 101-4 are arranged concentrically at equal intervals, the number of antenna elements is not limited to 4. In the present invention, a MIMO channel matrix obtained in a state in which the transmission and reception UCA antennas face each other is defined as an ideal MIMO channel matrix ($H_{ideal}$).

When an element of the MIMO channel matrix is represented by $h_{k,\,l}$ (let k be a reception antenna element number, and let l be a transmission antenna element number), $h_{k,\,l}$ is expressed by a distance ($d_{k,\,l}$) between the corresponding transmission and reception antenna elements and a wavelength ($\lambda$) of an RF signal, as expressed by the following (Equation 1).

$$h_{k,l} = \exp\left(-j\frac{2\pi}{\lambda}d_{k,l}\right) \qquad \text{(Equation 1)}$$

After the apparatus specifications and installation conditions are determined, since the distance ($d_{k,\,l}$) between the antenna elements can be obtained from the array diameter, the number of antenna elements, and the link distance and the wavelength $\lambda$ is determined from the RF frequency, an ideal MIMO channel matrix can be calculated.

Figure 8:
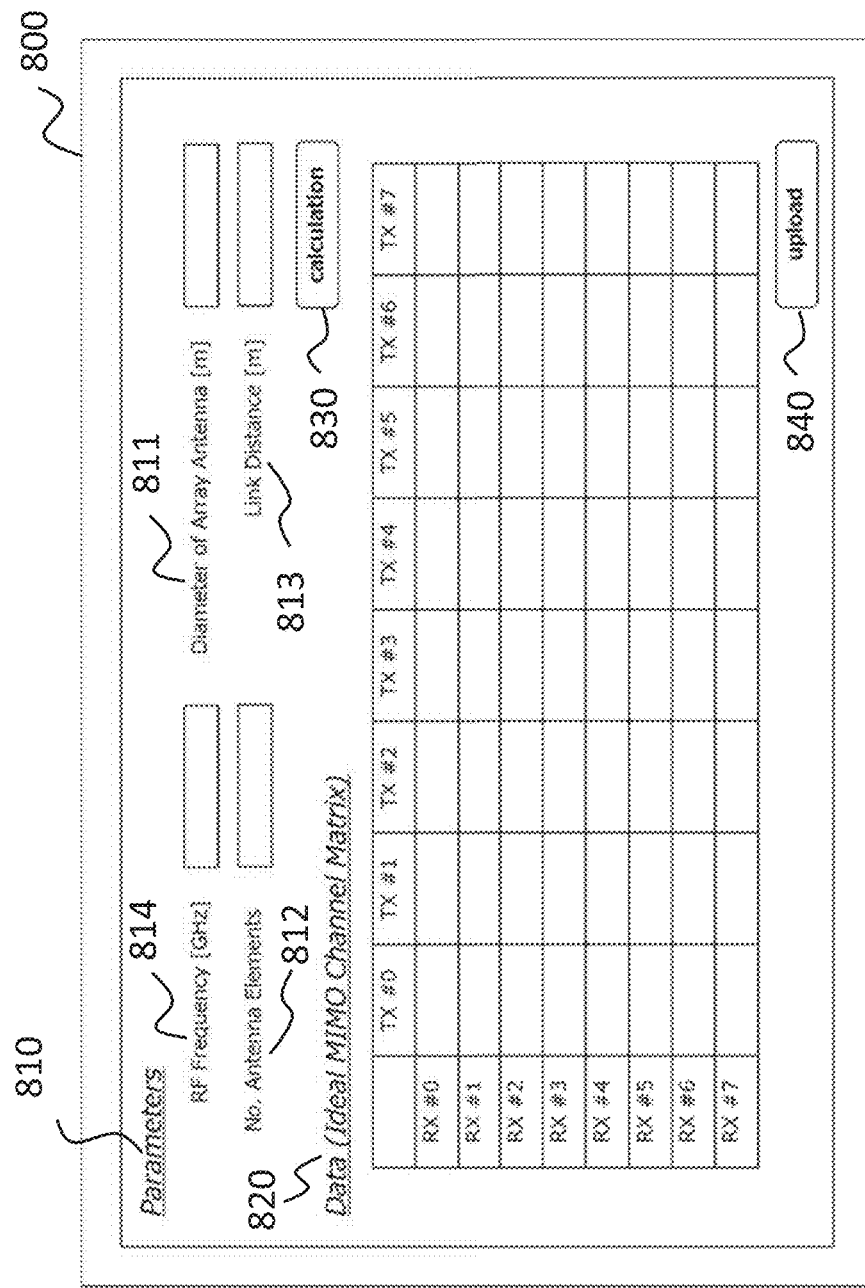
FIG. 8 is a diagram illustrating an example of a PC monitor for setting an ideal MIMO channel matrix.

FIG. 8 is a diagram illustrating an example of a PC (personal computer) monitor 800 for setting an ideal MIMO channel matrix. For example, as illustrated in FIG. 8, by using the array diameter (Diameter of Array Antenna) 811, the number of antenna elements (No. of Antenna Elements) 812, the link distance (Link Distance) 813, and the RF Frequency (or wavelength) 814 as parameters (Parameters)

810, information about an ideal MIMO channel matrix (Data (Ideal MIMO Channel Matrix)) 820 is calculated (830) on the calculation apparatus (PC: personal computer) or is downloaded from a database (DB) and uploaded (840) to the OAM mode multiplexing transmitting and receiving apparatus.

An actual MIMO channel is affected by a tilt of a UCA antenna and an individual difference in characteristics among the RF circuits. As expressed by (Equation 2), a MIMO channel matrix estimated by the MIMO channel estimation circuit 640 is expressed by a matrix product of a matrix ($R_{TX}$) representing the influence of a tilt of a UCA antenna and an individual difference in characteristics among the RF circuits on the transmitting end, a matrix ($R_{RX}$) representing the influence of a tilt of a UCA antenna and an individual difference in characteristics among the RF circuits on the receiving end, and the ideal MIMO channel matrix ($H_{ideal}$).

$$\hat{H} = R_{RX} H_{ideal} R_{TX} \quad \text{(Equation 2)}$$

In a case of a communication apparatus used in, for example, mobile backhaul and fronthaul in which a line-of-sight environment is assumed, the tilt of the individual UCA antenna is adjusted at the time of installation so that the transmission and reception UCA antennas face each other to the extent possible. Therefore, the installation error of the individual antenna is minute. While the individual antenna may temporally tilt due to wind or vibration after the installation, since the individual antenna is normally installed on a solid base such as an iron pole or an iron tower so as to prevent deterioration of the reception level, the tilt of the individual antenna caused by antenna vibration is assumed to be minute.

When the transmission and reception UCA antennas are slightly tilted from the state in which the transmission and reception UCA antennas face each other, the matrix ($R_{TX}$) representing the influence of the tilt of the UCA antenna and the individual difference in characteristics among the RF circuits on the transmitting end and the matrix ($R_{RX}$) representing the influence of the tilt of the UCA antenna and the individual difference in characteristics among the RF circuits on the receiving end can be approximated to diagonal matrices as expressed by (Equation 3). If the antenna installation error and the antenna vibration are minute, it can be said that the variation in signal amplitude is small and the need for the correction is low. Regarding the signal amplitude correction, for example, amplitude correction values can be determined based on the elements of the estimated MIMO channel matrix. In contrast, since the signal phase is expressed by dividing the path length between the transmission and reception antenna elements by the wavelength as expressed by (Equation 1), for example, when a communication apparatus using millimeter waves is used, phase rotation occurs even with a slight tilt of an antenna. This results in deterioration of reception quality in OAM multiplexing/demultiplexing using IDFT/DFT. Therefore, a signal phase correction function according to an antenna tilt is particularly important.

$$R_{TX} \sim \text{diag}\{r_0^{TX}, r_1^{TX}, \ldots, r_{N-1}^{TX}\} = \text{diag}\{e^{j\rho_0^{TX}}, e^{j\rho_1^{TX}}, \ldots, e^{j\rho_{N-1}^{TX}}\}$$

$$R_{RX} \sim \text{diag}\{r_0^{RX}, r_1^{RX}, \ldots, r_{N-1}^{RX}\} = \text{diag}\{e^{j\rho_0^{RX}}, e^{j\rho_1^{RX}}, \ldots, e^{j\rho_{N-1}^{RX}}\} \quad \text{(Equation 3)}$$

When the matrix ($R_{TX}$) and the matrix ($R_{RX}$) are not approximated by diagonal matrices, correction needs to be performed, for example, by calculating an N×N transmission weight matrix and an N×N reception weight matrix based on singular value decomposition of the estimated MIMO channel matrix. The number of multipliers needed for the correction circuit is on the order of $N^2$, thereby increasing the circuit scale.

As in the present invention and PTL 1, when the matrix ($R_{TX}$) and the matrix ($R_{RX}$) are approximated to diagonal matrices, it is only necessary to prepare a correction circuit for each transmission and reception antenna. Thus, since the number of multipliers needed is on the order of N, the circuit scale is not increased.

Figure 9:
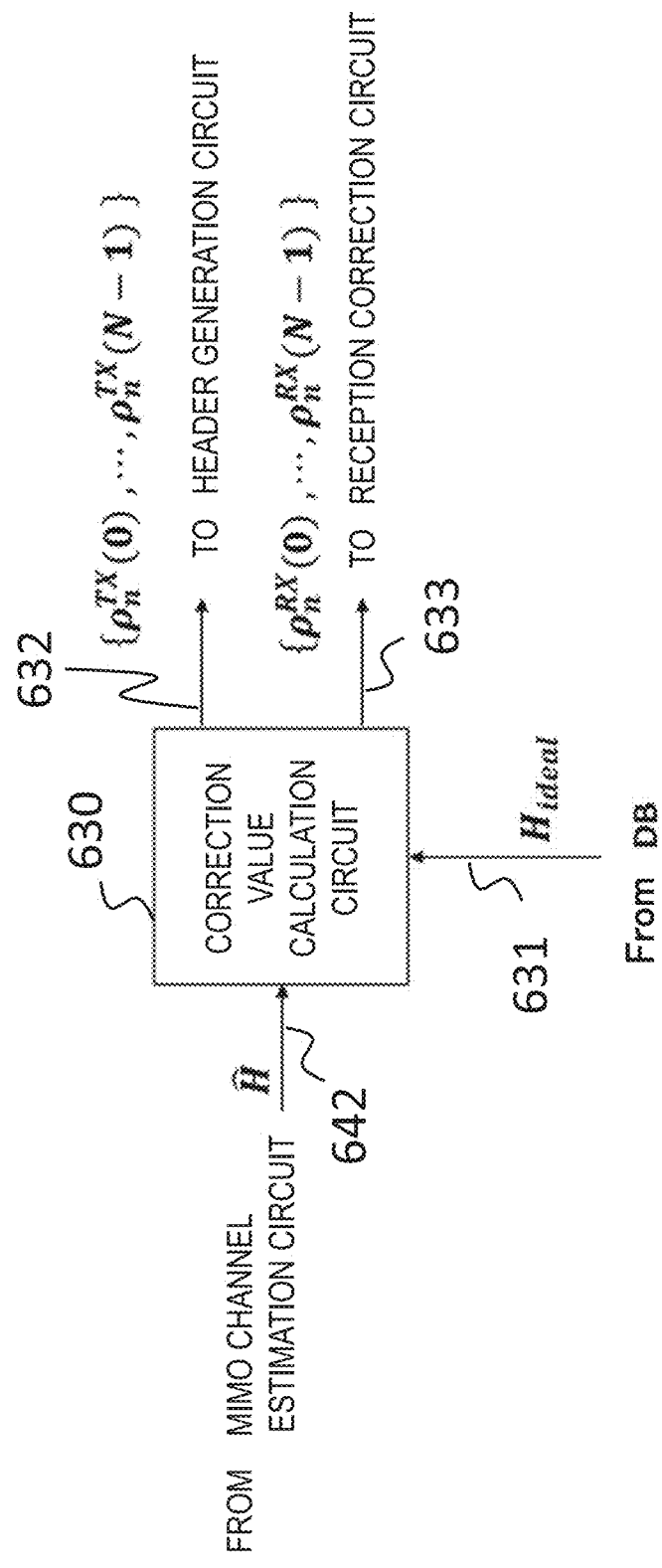
FIG. 9 is a block diagram illustrating a correction value calculation circuit according to the first example embodiment of the present invention.

FIG. 9 is a block diagram illustrating the correction value calculation circuit 630 illustrated in FIG. 6 according to the first example embodiment of the present invention. In FIG. 9, components denoted by the same reference numerals as those in FIG. 6 indicate the same components. As illustrate in FIG. 9, the correction value calculation circuit 630 receives a MIMO channel matrix 642 estimated by the MIMO channel estimation circuit 640 illustrated in FIG. 6 and the ideal MIMO channel matrix ($H_{ideal}$) and obtains correction target phases 632 and 633.

A calculation procedure of the correction target phases 632 and 633 will be described below.
[Calculation Procedure]

(Equation 4) represents the relationship expressed by the above (Equation 1) as a product of matrix elements corresponding to a k-th reception antenna element and an l-th transmission antenna element.

$$\hat{h}_{k,l} = r_k^{RX} h_{k,l} r_l^{TX} \quad \text{(Equation 4)}$$

Since the ideal MIMO channel matrix has already been obtained previously, as expressed by (Equation 5), by dividing the elements of the estimated MIMO channel matrix by the elements of the ideal MIMO channel matrix, a product of an element of a matrix representing the influence of the tilt of the UCA antenna and the individual difference in characteristics among the RF circuits on the transmitting end and an element of a matrix representing the influence of the tilt of the UCA antenna and the individual difference in characteristics among the RF circuits on the receiving end can be extracted.

$$c_{k,l} = \hat{h}_{k,l}/h_{k,l} = r_k^{RX} r_l^{TX} \quad \text{(Equation 5)}$$

Next, by performing the following calculation in accordance with the procedure of (Equation 6), a signal phase based on a signal phase corresponding to an n-th antenna can be obtained.

$$p_l = \sum_{k=0}^{N-1} c_{k,l} = r_l^{TX} \sum_{k=0}^{N-1} r_k^{RX} \quad \text{(Equation 6)}$$

$$q_k = \sum_{l=0}^{N-1} c_{k,l} = r_k^{RX} \sum_{l=0}^{N-1} r_l^{TX}$$

$$a_n^{TX}(m) = p_m/p_n$$

$$a_n^{RX}(m) = q_m/q_n$$

$$\rho_n^{TX}(m) = \arctan\left(\frac{a_n^{TX}(m) \cdot \text{Im}}{a_n^{TX}(m) \cdot \text{Re}}\right)$$

$$\rho_n^{RX}(m) = \arctan\left(\frac{a_n^{RX}(m) \cdot \text{Im}}{a_n^{RX}(m) \cdot \text{Re}}\right)$$

These values are set in the transmission correction circuits 613 and the reception correction circuits 623 in FIG. 6 as the correction values.

The transmission correction circuits 613 to which the transmission correction values are supplied are the transmission correction circuits 613 in the opposite OAM mode multiplexing transmitting and receiving apparatus 330. Thus, the transmission correction values are embedded in the transmission frames 400 by the header generation circuits 610, and the embedded transmission correction values are extracted by the header extraction circuits 620 in the opposite OAM mode multiplexing transmitting and receiving apparatus 330 and supplied to the transmission correction circuit 613 in the opposite OAM mode multiplexing transmitting and receiving apparatus 330.

Figure 10:
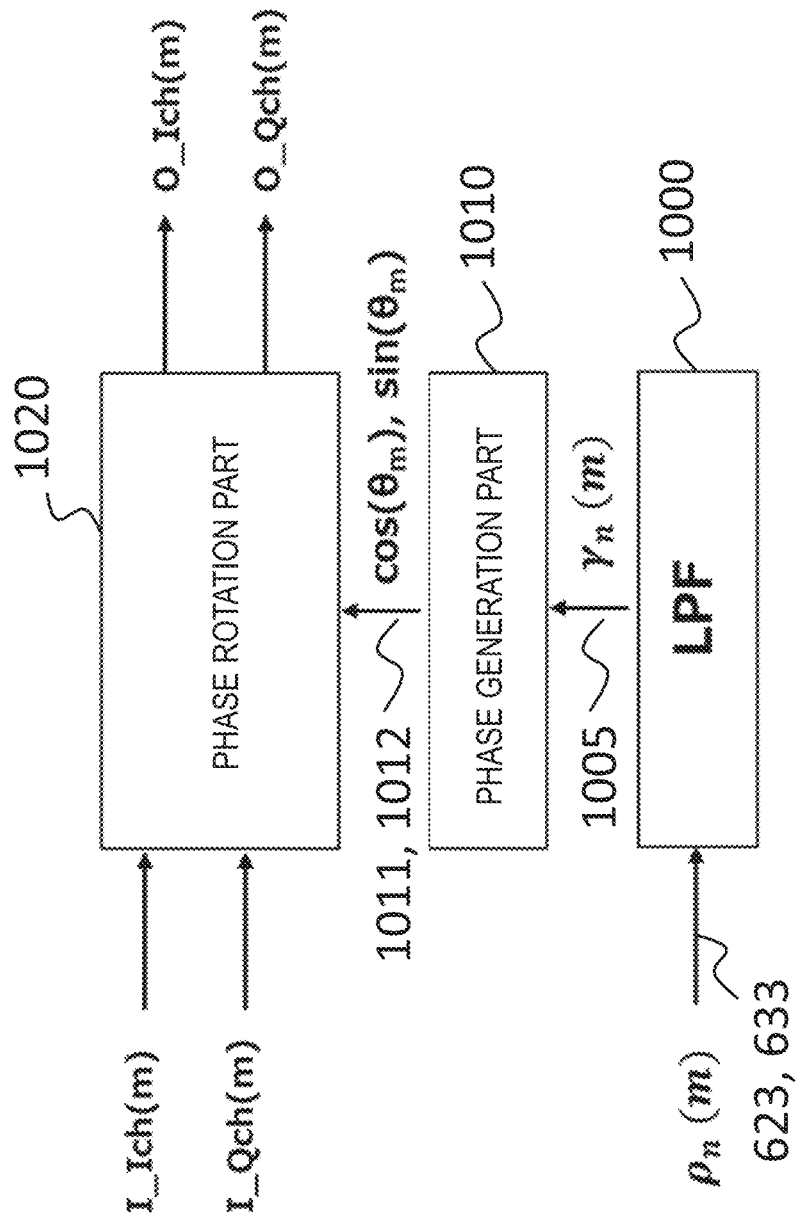
FIG. 10 is a block diagram illustrating a configuration of a correction circuit according to the first example embodiment of the present invention.

FIG. 10 is a block diagram illustrating a configuration of a correction circuit according to the first example embodiment of the present invention. As illustrated in FIG. 10, the transmission correction circuit 613 or the reception correction circuit 623 includes an LPF 1000, a phase generation part 1010, and a phase rotation part 1020. The LPF 1000 and the phase generation part 1010 are driven at the transmission intervals of the frames 400. In contrast, since the phase rotation part 1020 reacts to main signals, the phase rotation part 1020 is driven at the intervals (symbol intervals) of the main signals.

Figure 11:
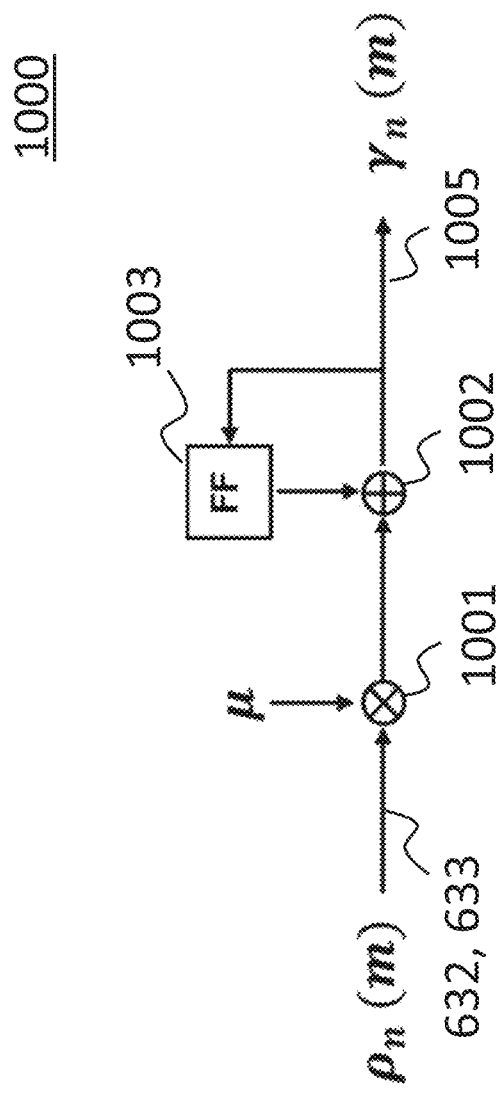
FIG. 11 is a block diagram illustrating a configuration of an LPF in the correction circuit according to the first example embodiment of the present invention.

FIG. 11 is a block diagram illustrating a configuration of the LPF 1000 of the correction circuit illustrated in FIG. 10 according to the first example embodiment of the present invention. The LPF 1000 illustrated in FIG. 11 includes a multiplier 1001, an adder 1002, and an FF (flip-flop) 1003, receives the correction target phases 632 and 633, and outputs an output signal 1005. $\mu$ is a positive number smaller than 1 and a parameter for determining a cutoff frequency of the LPF 1000. It is possible to individually set $\mu$ for each of the transmission correction values and reception correction values.

The reception quality is assumed to deteriorate when the antenna vibrates at a high speed by strong wind or the like. To maintain reception quality high even when the antenna vibrates at a high speed, it is preferable to increase $\mu$ of the LPF 1000. However, if $\mu$ is excessively increased, the system becomes unstable (the reception quality deteriorates) due to its own excessive response. The upper limit of $\mu$ at which stable correction is achieved depends on the time needed from the calculation of the correction values to the setting of the correction values. The longer a time from the calculation of the correction values to the setting of the correction values becomes, the smaller the upper limit of the $\mu$ at which stable correction becomes. In particular, the upper limit of $\mu$ in the transmission correction becomes smaller due to the time needed for feeding back the correction values calculated on the receiving end to the transmitting end.

According to the first example embodiment of the present invention, since the correction values can be calculated at a low cost, the total time needed from the calculation of the correction values to the setting of the correction values can be shortened. Thus, the following capability with respect to the antenna vibration in the OAM mode multiplexing radio transmission system can be enhanced.

Figure 12:
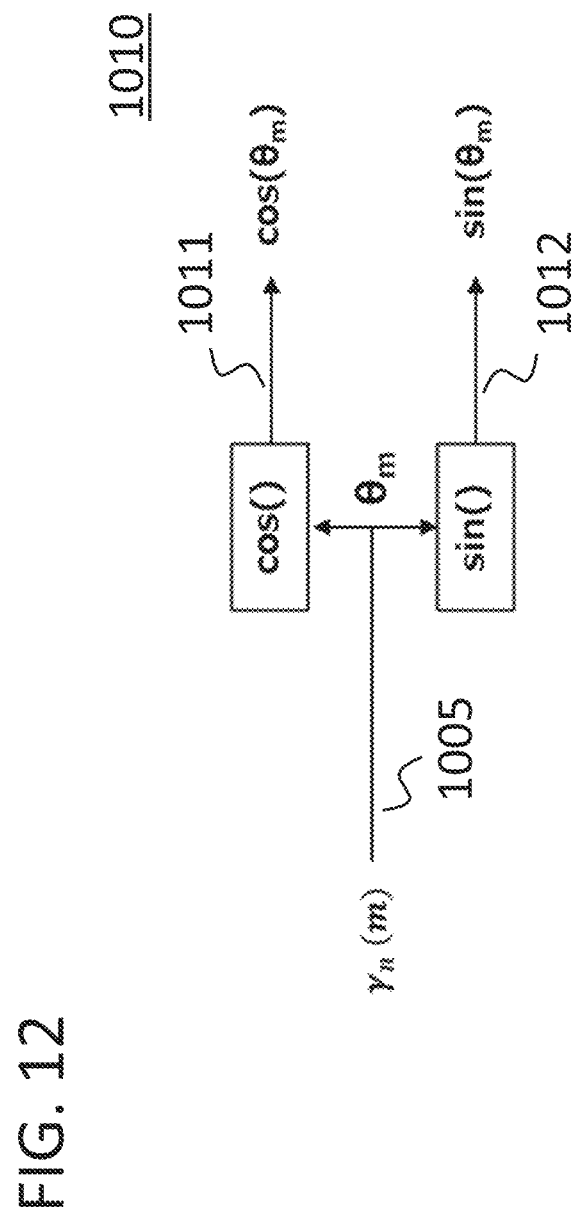
FIG. 12 is a block diagram illustrating a configuration of a phase generation part in the correction circuit according to the first example embodiment of the present invention.

FIG. 12 is a block diagram illustrating a configuration of the phase generation part 1010 in the correction circuit illustrated in FIG. 10 according to the first example embodiment of the present invention. The phase generation part 1010 illustrated in FIG. 12 converts the output signal 1005 of the LPF 1000 into a cosine 1011 and a sine 1012 and outputs the cosine 1011 and the sine 1012.

Figure 13:
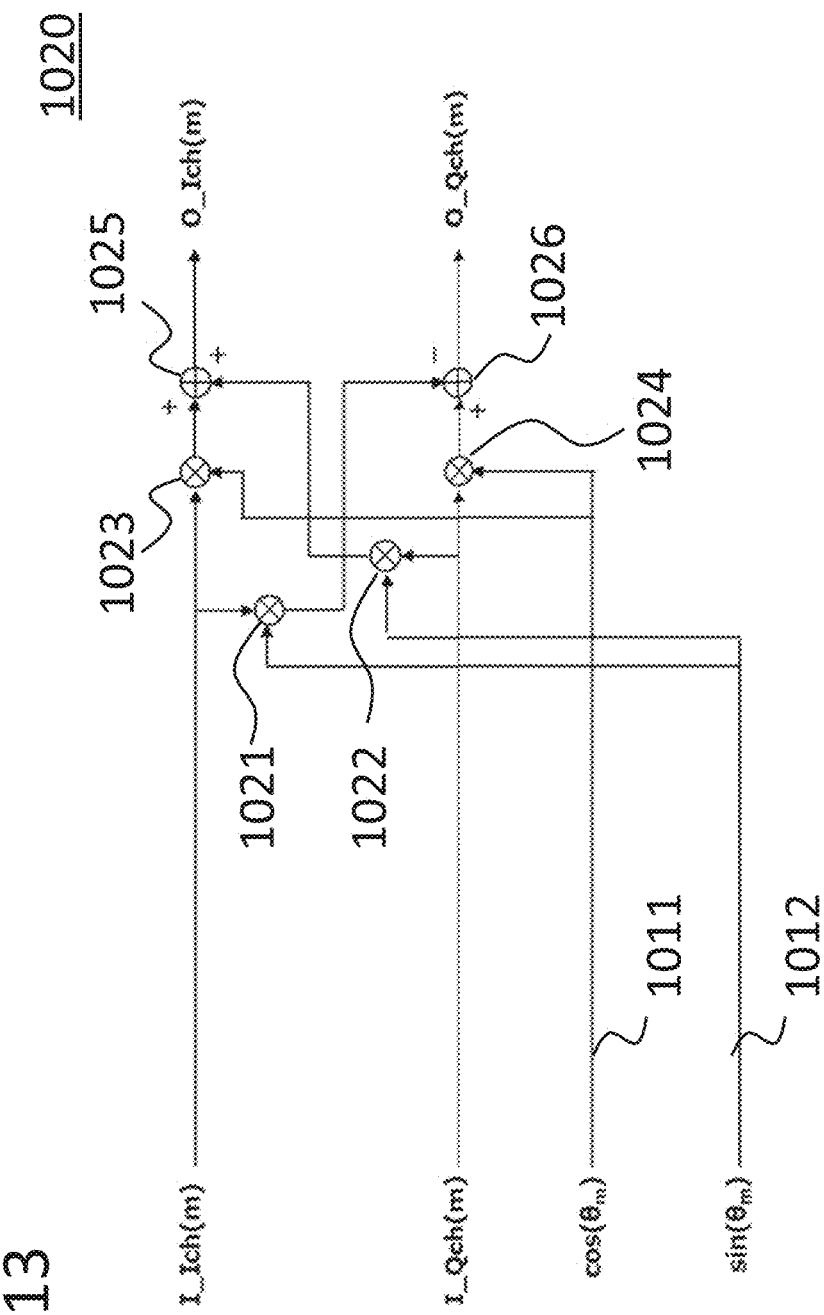
FIG. 13 is a block diagram illustrating a configuration of a phase rotation part in the correction circuit according to the first example embodiment of the present invention.

FIG. 13 is a block diagram illustrating a configuration of the phase rotation part 1020 in the correction circuit illustrated in FIG. 10 according to the first example embodiment of the present invention. The phase rotation part 1020 illustrated in FIG. 13 includes multipliers 1021, 1022, 1023, and 1024, an adder 1025, and a subtractor 1026. The phase rotation part 1020 performs phase correction on the received main signals (I_Ich and I_Qch) by using the values of the cosine 1011 and the sine 1012 received from the phase generation part 1010.

Next, an operation according to the first example embodiment of the present invention will be described in detail below with reference to drawings.

Figure 14:
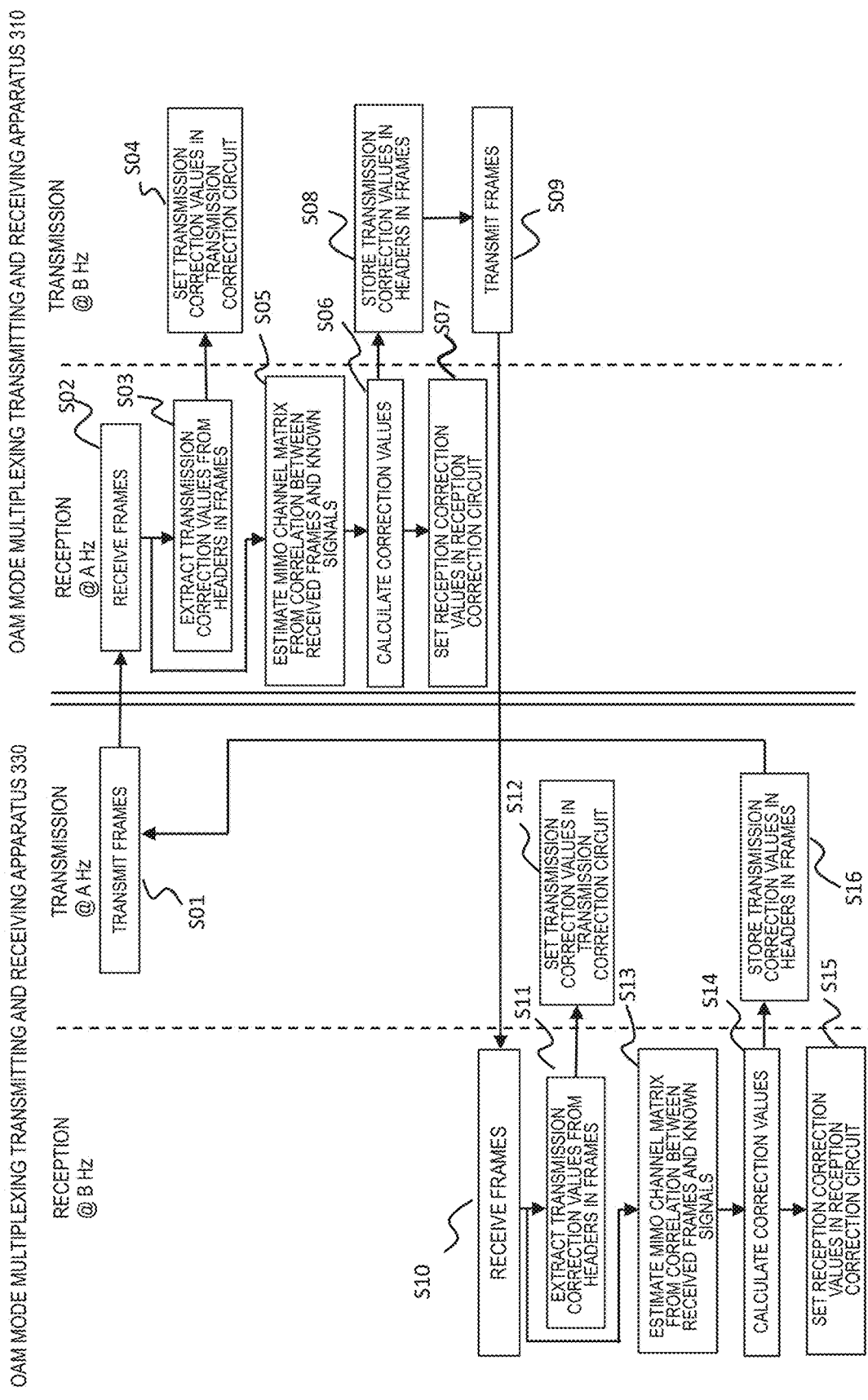
FIG. 14 is a diagram illustrating an operational flow according to the first example embodiment of the present invention.

FIG. 14 is a diagram illustrating an operational flow according to the first example embodiment of the present invention. Since the following description assumes bidirectional communication using FDD, the frequencies are denoted as A Hz and B Hz in FIG. 14.

The two columns on the left side of FIG. 14 illustrate a flow performed by the OAM mode multiplexing transmitting and receiving apparatus 330 in the OAM mode multiplexing transmission apparatus 302 illustrated in FIG. 3 that receives signals at B Hz and transmits signals at A Hz. The two columns on the right side of FIG. 14 illustrate a flow performed by the OAM mode multiplexing transmitting and receiving apparatus 310 in the OAM mode multiplexing transmission apparatus 301 illustrated in FIG. 3 that receives signals at A Hz and transmits signals at B Hz. Hereinafter, the operational flow will be described with reference to FIGS. 3, 4, 6, and 14. The following description will be made assuming that the OAM mode multiplexing transmitting and receiving apparatuses 310 and 330 in FIG. 3 have the same configuration. While FIG. 6 illustrates an example of the configuration of each of the OAM mode multiplexing transmitting and receiving apparatuses 310 and 330, the OAM mode multiplexing transmitting and receiving apparatuses 310 and 330 may each have a different configuration.

In step S01 in FIG. 14, the OAM mode multiplexing transmitting and receiving apparatus 330 illustrated in FIG. 3 generates the transmission frames 400 illustrated in FIG. 4 and transmits the generated transmission frames 400 at A Hz to the OAM mode multiplexing transmitting and receiving apparatus 310 illustrated in FIG. 3.

Next, in step S02, the OAM mode multiplexing transmitting and receiving apparatus 310 receives the transmission frames 400 at A Hz. Next, in step S03, the OAM mode multiplexing transmitting and receiving apparatus 310 extracts the transmission correction values from the headers 402 in the received transmission frames 400.

Since these transmission correction values are the values that the OAM mode multiplexing transmitting and receiving apparatus 330 has obtained from the signals received at B Hz, in step S04 the transmission correction values are set in the transmission correction circuit 613 of B Hz in the OAM mode multiplexing transmitting and receiving apparatus 310 illustrated in FIG. 6.

Next, in step S05, the MIMO channel estimation circuit 640 in the OAM mode multiplexing transmitting and receiving apparatus 310 estimates a MIMO channel matrix by performing a correlation calculation between the known signals 401 at the head portions of the transmission frames 400 received at A Hz and the original known signals.

Next, in step S06, the correction value calculation circuit 630 in the OAM mode multiplexing transmitting and receiving apparatus 310 calculates transmission and reception correction values at A Hz by using the MIMO channel matrix estimated by the MIMO channel estimation circuit 640 in the OAM mode multiplexing transmitting and receiving apparatus 310 and an ideal MIMO channel matrix.

In step S07, the reception correction values among the calculated transmission and reception correction values are set in the reception correction circuit 623 in the OAM mode multiplexing transmitting and receiving apparatus 310. In addition, since the transmission correction values among the calculated transmission and reception correction values need to be fed back to the OAM mode multiplexing transmitting and receiving apparatus 330 on the transmitting end, in step S08 these transmission correction values are stored in the headers 402 in the transmission frames 400 to be transmitted by the OAM mode multiplexing transmitting and receiving apparatus 310.

In step S09, the OAM mode multiplexing transmitting and receiving apparatus 310 generates the transmission frames 400 illustrated in FIG. 4 and transmits the generated frames at B Hz to the OAM mode multiplexing transmitting and receiving apparatus 330.

Next, in step S10, the OAM mode multiplexing transmitting and receiving apparatus 330 receives the transmission frames 400 at B Hz. Next, in step S11, the OAM mode multiplexing transmitting and receiving apparatus 330 extracts the transmission correction values from the headers 402 in the received transmission frames 400.

Since these transmission correction values are the values that the OAM mode multiplexing transmitting and receiving apparatus 310 has obtained from the signals received at A Hz, in step S12 the transmission correction values are set in the transmission correction circuit 613 of A Hz in the OAM mode multiplexing transmitting and receiving apparatus 330 illustrated in FIG. 6.

In step S13, the MIMO channel estimation circuit 640 in the OAM mode multiplexing transmitting and receiving apparatus 330 estimates a MIMO channel matrix by performing a correlation calculation between the known signals 401 at the head portions of the transmission frames 400 received at B Hz and the original known signals.

In step S14, the correction value calculation circuit 630 in the OAM mode multiplexing transmitting and receiving apparatus 330 calculates transmission and reception correction values at B Hz by using the MIMO channel matrix estimated by the MIMO channel estimation circuit 640 in the OAM mode multiplexing transmitting and receiving apparatus 330 and the ideal MIMO channel matrix.

In step S15, the reception correction values among the calculated transmission and reception correction values are set in the reception correction circuit 623 in the OAM mode multiplexing transmitting and receiving apparatus 330. In addition, since the transmission correction values among the calculated transmission and reception correction values need to be fed back to the OAM mode multiplexing transmitting and receiving apparatus 310 on the transmitting end, in step S16 these transmission correction values are stored in the headers 402 in the transmission frames 400 to be transmitted by the OAM mode multiplexing transmitting and receiving apparatus 330. Thereafter, the above processing is repeated.

The first example embodiment of the present invention can provide an OAM mode multiplexing transmission apparatus that is capable of regularly correcting the influence of an antenna tilt and an individual difference among the RF circuits and that has a reduced circuit implementation scale for the base band signal processing for realizing the correction.

In addition, the first example embodiment of the present invention can provide an OAM mode multiplexing transmission apparatus that is capable of maintaining reception quality good even when an antenna temporally significantly vibrates due to disturbance such as wind and vibration.

The present invention is applicable to wireless communication, mobile backhaul, mobile fronthaul, drone wireless communication, etc. in a line-of-sight good-visibility environment.

While example embodiments of the present invention have thus been described, the present invention is not limited thereto. Further variations, substitutions, or adjustments can be made without departing from the basic technical concept of the present invention. For example, the configurations of the networks, the configurations of the elements, and the representation modes of the messages illustrated in the drawings have been used only as examples to facilitate understanding of the present invention. That is, the present invention is not limited to the configurations illustrated in the drawings. In addition, in the following description, "A and/or B" signifies at least one of A and B.

Figure 15:
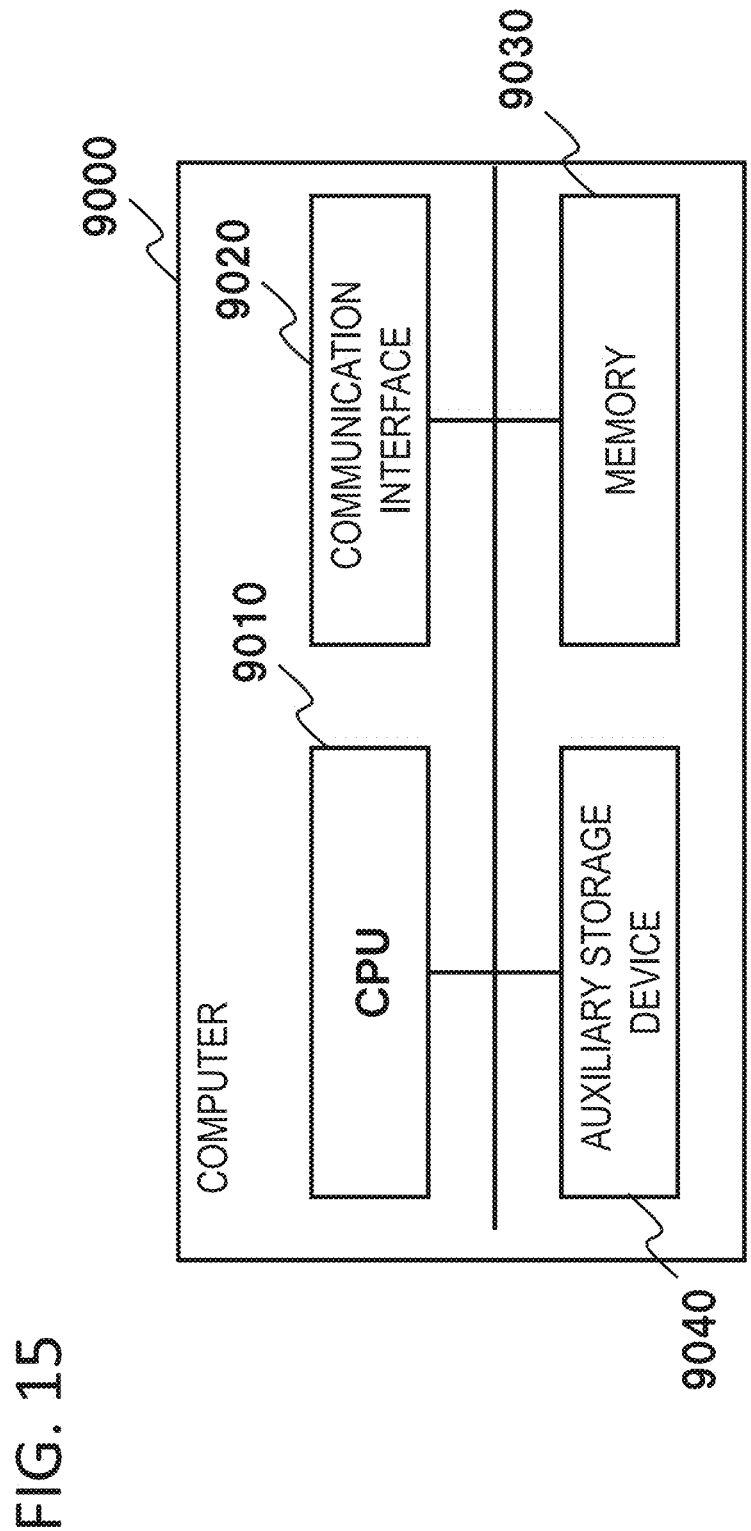
FIG. 15 is a diagram illustrating a configuration of a computer constituting an OAM mode multiplexing transmission apparatus of the present invention.

In addition, the procedure described in the above first example embodiment can be realized by a program that causes a computer (computer 9000 in FIG. 15) functioning as the OAM mode multiplexing transmission apparatus 301 to realize the functions as the OAM mode multiplexing transmission apparatus 301. For example, this computer includes a CPU (central processing unit) 9010, a communication interface 9020, a memory 9030, and an auxiliary storage device 9040 as illustrated in FIG. 15. That is, the CPU 9010 in FIG. 15 executes the program for correcting the OAM mode multiplexing transmission apparatus and performs update processing on calculation parameters held in the auxiliary storage device 9040 or the like.

The memory 9030 is a RAM (random access memory), a ROM (read-only memory), or the like.

That is, the individual parts (processing means, functions) of the OAM mode multiplexing transmission apparatuses according to the above example embodiments can each be realized by a computer program that causes the processor in the computer to use corresponding hardware and execute the corresponding processing as described above.

Finally, suitable modes of the present invention will be summarized.

[Mode 1]
(See the OAM mode multiplexing transmission apparatus according to the above first aspect.)

[Mode 2]
In the OAM mode multiplexing transmission apparatus according to mode 1, it is preferable that the correction circuit include a low-pass filter that filters the correction values.

[Mode 3]
In the OAM mode multiplexing transmission apparatus according to mode 1 or 2, it is preferable that the correction circuit include a transmission correction circuit and a reception correction circuit and that the correction value calculation circuit calculate transmission correction values for the transmission correction circuit and reception correction values for the reception correction circuit.

[Mode 4]
In the OAM mode multiplexing transmission apparatus according to mode 3, it is preferable that the reception correction circuit include a low-pass filter that filters the reception correction values.

[Mode 5]
In the OAM mode multiplexing transmission apparatus according to mode 3 or 4, it is preferable that the transmission correction circuit include a low-pass filter that filters the transmission correction values.

[Mode 6]
(See the OAM mode multiplexing radio transmission system according to the above second aspect.)

[Mode 7]
In the OAM mode multiplexing radio transmission system according to mode 6, it is preferable that the correction circuit of the first OAM mode multiplexing transmission apparatus and the correction circuit of the second OAM mode multiplexing transmission apparatus each include a low-pass filter that filters their respective correction values.
[Mode 8]
In the OAM mode multiplexing radio transmission system according to mode 6 or 7, it is preferable that the correction value feedback part of the second OAM mode multiplexing transmission apparatus on the receiving end regularly feed back the transmission correction values for the transmission correction circuit on the transmitting end to the first OAM mode multiplexing transmission apparatus on the transmitting end.
[Mode 9]
(See the method for correcting an OAM mode multiplexing transmission apparatus according to the above third aspect.)
[Mode 10]
(See the program according to the above fourth aspect.)

The disclosure of each of the above PTLs is incorporated herein by reference thereto. Modifications and adjustments of the example embodiments and examples are possible within the scope of the overall disclosure (including the claims) of the present invention and based on the basic technical concept of the present invention. Various combinations or selections of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

What is claimed is:

1. An OAM (Orbital Angular Momentum) mode multiplexing transmission apparatus, comprising:
   at least a processor; and
   a memory in circuit communication with the processor, wherein the processor is configured to execute program instructions stored in the memory to implement:
   a UCA (Uniform Circular Array) antenna that includes N antenna elements (N is an integer of 2 or more) arranged in a ring shape at equal intervals;
   a correction circuit that corrects an antenna tilt and an individual difference in characteristics among RF (Radio Frequency) circuits by using correction values;
   a correction value calculation circuit that calculates the correction values; and
   a correction value feedback part that regularly feeds back the correction values from a receiving end to a transmitting end;
   wherein the correction value calculation circuit is connected to a database that stores information about an ideal MIMO (Multiple Input and Multiple Output) channel matrix, which is calculated by using an array diameter of the UCA antenna, a number of antenna elements, an RF frequency, and a link distance as parameters, in a state in which transmission and reception UCA antennas face each other, or is connected to a calculation apparatus that calculates the information; and
   wherein the correction value calculation circuit regularly calculates the correction values relating to signal phase rotation by using a MIMO channel matrix estimated with known signals embedded in received transmission frames and the ideal MIMO channel matrix.

2. The OAM mode multiplexing transmission apparatus according to claim 1, wherein the correction circuit includes a low-pass filter that filters the correction values.

3. The OAM mode multiplexing transmission apparatus according to claim 1, wherein the correction circuit includes a transmission correction circuit and a reception correction circuit, and the correction value calculation circuit calculates transmission correction values for the transmission correction circuit and reception correction values for the reception correction circuit.

4. The OAM mode multiplexing transmission apparatus according to claim 3, wherein the reception correction circuit includes a low-pass filter that filters the reception correction values.

5. The OAM mode multiplexing transmission apparatus according to claim 3, wherein the transmission correction circuit includes a low-pass filter that filters the transmission correction values.

6. An OAM mode multiplexing radio transmission system, comprising a first OAM mode multiplexing transmission apparatus according to claim 1 on the transmitting end that transmits the transmission frames and a second OAM mode multiplexing transmission apparatus according to claim 1 on the receiving end that receives the transmission frames.

7. The OAM mode multiplexing radio transmission system according to claim 6, wherein the correction circuit of the first OAM mode multiplexing transmission apparatus and the correction circuit of the second OAM mode multiplexing transmission apparatus each include a low-pass filter that filters their respective correction values.

8. The OAM mode multiplexing radio transmission system according to claim 6, wherein the correction value feedback part of the second OAM mode multiplexing transmission apparatus on the receiving end regularly feeds back the transmission correction values for the transmission correction circuit on the transmitting end to the first OAM mode multiplexing transmission apparatus on the transmitting end.

9. A method for correcting an OAM (Orbital Angular Momentum) mode multiplexing transmission apparatus, which includes a UCA (Uniform Circular Array) antenna that includes N antenna elements (N is an integer of 2 or more) arranged in a ring shape at equal intervals, a correction circuit, a correction value calculation circuit that calculates correction values, and a correction value feedback part and in which the correction value calculation circuit is connected to a database that stores information about an ideal MIMO (Multiple Input and Multiple Output) channel matrix, which is calculated by using an array diameter of the UCA antenna, a number of antenna elements, an RF frequency, and a link distance as parameters, in a state in which transmission and reception UCA antennas face each other, or is connected to a calculation apparatus that calculates the information, the method comprising:
   by the correction value calculation circuit, regularly calculating the correction values relating to signal phase rotation by using a MIMO channel matrix estimated with known signals embedded in received transmission frames and the ideal MIMO channel matrix;
   by the correction circuit, correcting an antenna tilt and an individual difference in characteristics among RF circuits by using the correction values; and
   by the correction value feedback part, regularly feeding back the correction values from a receiving end to a transmitting end.

10. The method for correcting the OAM mode multiplexing transmission apparatus according to claim 9, wherein the correction circuit includes a low-pass filter, and wherein the method further comprises, by the low-pass filter, filtering the correction values.

11. The method for correcting the OAM mode multiplexing transmission apparatus according to claim 9, wherein the correction circuit includes a transmission correction circuit and a reception correction circuit, and wherein the method further comprises, by the correction value calculation circuit, calculating transmission correction values for the transmission correction circuit and reception correction values for the reception correction circuit.

12. The method for correcting the OAM mode multiplexing transmission apparatus according to claim 11, wherein the reception correction circuit includes a low-pass filter, and wherein the method further comprises, by the low-pass filter, filtering the reception correction values.

13. The method for correcting the OAM mode multiplexing transmission apparatus according to claim 11, wherein the transmission correction circuit includes a low-pass filter, and wherein the method further comprises, by the low-pass filter, filtering the transmission correction values.

14. A non-transitory computer-readable recording medium recording storing a program causing a computer provided in an OAM (Orbital Angular Momentum) mode multiplexing transmission apparatus, which includes a UCA (Uniform Circular Array) antenna that includes N antenna elements (N is an integer of 2 or more) arranged in a ring shape at equal intervals and which is connected to a database that stores information about an ideal MIMO (Multiple Input and Multiple Output) channel matrix, which is calculated by using an array diameter of the UCA antenna, a number of antenna elements, an RF frequency, and a link distance as parameters, in a state in which transmission and reception UCA antennas face each other or which is connected to a calculation apparatus that calculates the information, to perform processing for:

regularly calculating correction values relating to signal phase rotation by using a MIMO channel matrix estimated with known signals embedded in received transmission frames and the ideal MIMO channel matrix;

correcting an antenna tilt and an individual difference in characteristics among RF circuits by using the correction values; and regularly feeding back the correction values from a receiving end to a transmitting end.

15. The medium according to claim 14, wherein the program further causes the computer to low-pass filter the correction values.

16. The medium according to claim 14, wherein the program further causes the computer to calculate transmission correction values and reception correction values.

17. The medium according to claim 16, wherein the program further causes the computer to low-pass filter the reception correction values.

18. The medium according to claim 16, wherein the program further causes the computer to low-pass filter the transmission correction values.

* * * * *